Aug. 4, 1964    P. J. DONALD ETAL    3,143,588
RANGE MEASURING SYSTEM
Filed July 11, 1957                 3 Sheets-Sheet 1
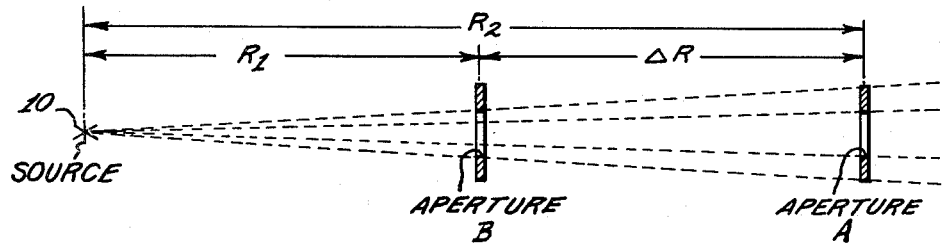
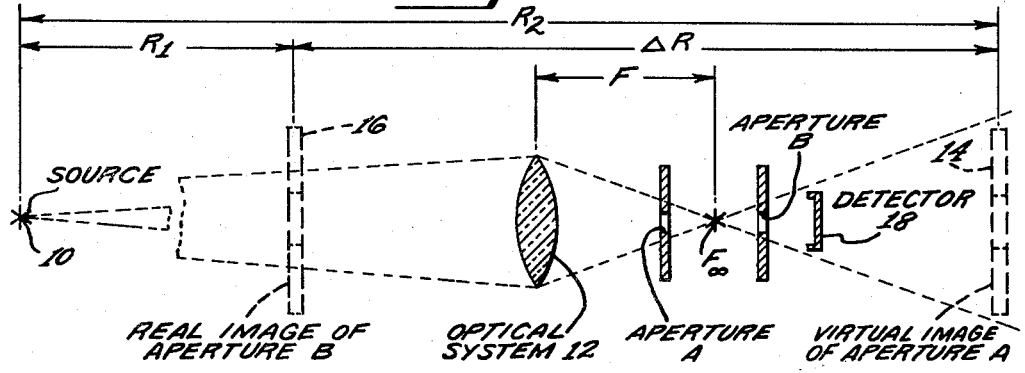
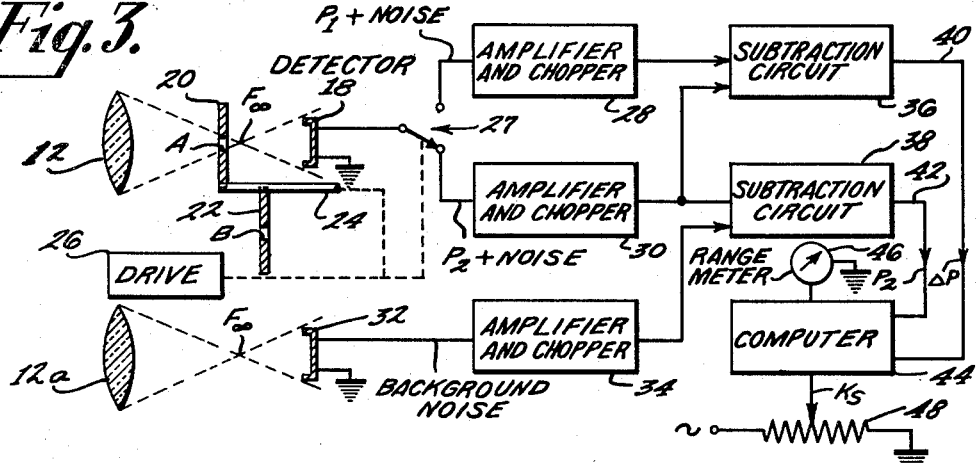
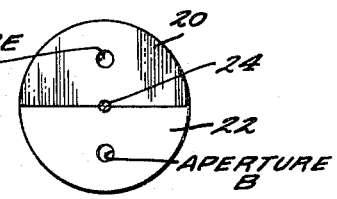
INVENTORS.
Philip J. Donald &
William E. Martin
BY
ATTORNEY.

Aug. 4, 1964    P. J. DONALD ETAL    3,143,588
RANGE MEASURING SYSTEM
Filed July 11, 1957    3 Sheets-Sheet 2
Fig. 5.
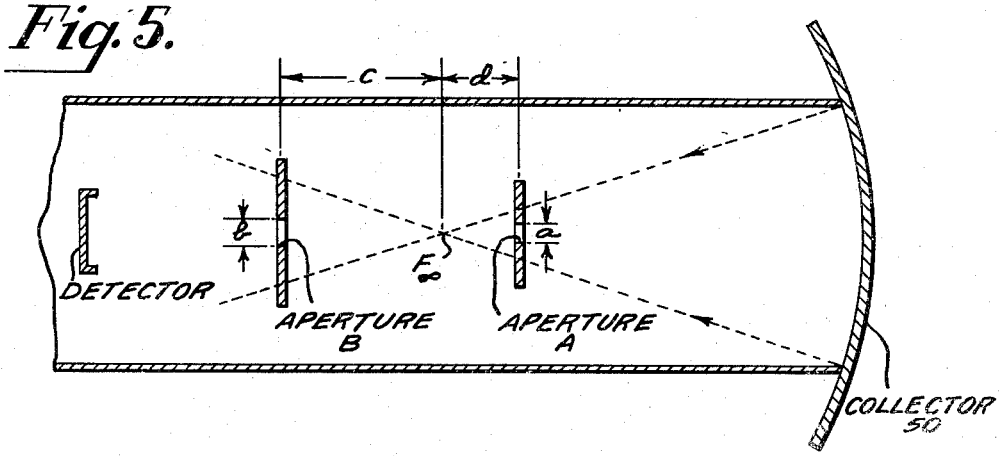
Fig. 6.
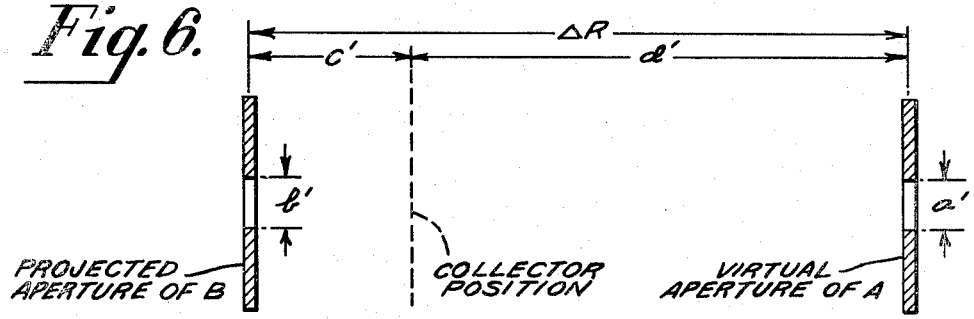
Fig. 7.
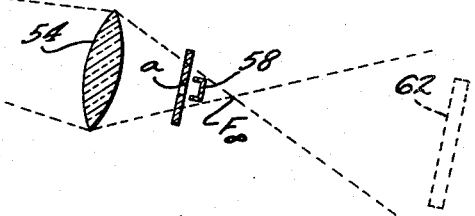
Fig. 8.
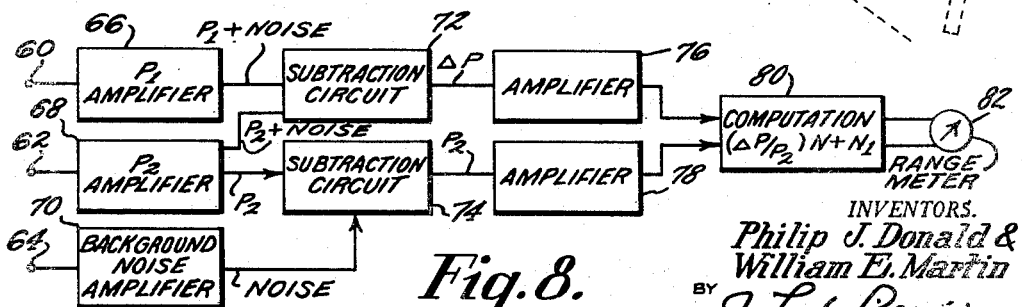
INVENTORS.
Philip J. Donald &
William E. Martin
BY
J. C. Whittaker
ATTORNEY.

Aug. 4, 1964   P. J. DONALD ETAL   3,143,588
RANGE MEASURING SYSTEM
Filed July 11, 1957   3 Sheets-Sheet 3

INVENTORS.
Philip J. Donald &
William E. Martin
BY
ATTORNEY.

United States Patent Office 3,143,588
Patented Aug. 4, 1964

3,143,588
RANGE MEASURING SYSTEM
Philip J. Donald, Woodbury, and William E. Martin, Pennsauken, N.J., assignors to Radio Corporation of America, a corporation of Delaware
Filed July 11, 1957, Ser. No. 671,331
1 Claim. (Cl. 88—1)

The present invention relates to an improved system for determining the range to a radiating object. While not restricted thereto, the invention is particularly applicable to the determination of the range of an aircraft, rocket, or similar heat radiator.

An object of this invention is to provide an improved and greatly simplified means for the passive determination of the range to a radiating object. As used here, the expression passive system implies a system which does not radiate energy toward the object.

According to this invention, energy radiated by the object is focused by a focusing system having a principal focus or focal point. The energy received at first and second object space erected apertures is sensed. The expression "object space erected aperture," as used herein, denotes an aperture which appears, to the energy it receives, to be located at a place other than its actual location and in more classic terms may be referred to as an entrance pupil. In one specific form of the invention, for example, one of the sensing means is located between the principal focus and the focusing system, whereby it appears as a virtual entrance pupil and sensing means located well beyond the focal point of the system; the second sensing means is located on the other side of the principal focus, whereby its real image appears as an entrance pupil well in front of the focusing system. From the configuration of the focusing system or by actual measurement with a telescope, the distance $\Delta R$ between the images of the two sensing means, or the distance between entrance pupils may readily be determined. Knowing $\Delta R$, the characteristics of the two sensing means, and the amounts of energy sensed by each, the range R to the radiating object may be determined. Applicants have also found, that when $\Delta R/R$ is 0.2 or less, the range to the radiating object is, within 1%, a straight line function of $\Delta P/P$, where $\Delta P$ is the difference in energies sensed at the two sensing points and P is the energy sensed at either sensing point.

The invention will be described in greater detail by reference to the following description taken in connection with the accompanying drawing in which:

FIGURE 1 is a sketch of a portion of a range determining system which is used to explain the basic principles behind the operation of the system of this invention;

FIGURE 2 is a schematic diagram to explain one form of the present invention;

FIGURE 3 is a schematic and block circuit diagram of a practical range system according to this invention;

FIGURE 4 is a front elevation view of the apertures shown in FIGURE 3;

FIGURE 5 is a schematic diagram showing a portion of another embodiment of a ranging system according to this invention;

FIGURE 6 is a diagram to explain the operation of the arrangement shown in FIGURE 5;

FIGURE 7 is a diagram of another type of ranging system according to this invention;

FIGURE 8 is a block circuit diagram of electronic components which may be used with the arrangement of FIGURE 7;

Similar reference characters are applied to similar elements throughout the figures.

Figure 9:
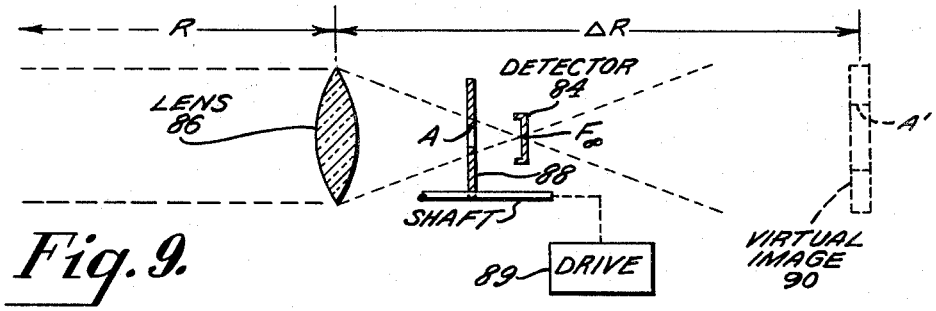
FIGURES 9, 10 and 11 are diagrams of other ranging arrangements according to the present invention.

Referring to FIGURE 1, assume that source 10 is a heat radiator such as the exhaust of a jet aircraft. Alternatively, source 10 may be any type of radiator such as a source of light, or a source of radio or sound waves or the like. The energy emitted by source 10 passes through aperture B spaced a distance $R_1$ from the source and through aperture A spaced a distance $R_2$ from the source. Although the apertures are shown aligned with one another, it is to be assumed for the purposes of this discussion that aperture B does not interfere with aperture A. The energy passing through aperture B is $P_1$ and the energy passing through aperture A is $P_2$. According to the inverse square law:

$$P_1 = \frac{K_1}{R_1^2} \qquad (1)$$

$$P_2 = \frac{K_2}{R_2^2} \qquad (2)$$

where $K_1$ and $K_2$ are constants which depend upon the sizes of apertures B and A, respectively, the spectral distribution of energy from the radiator and the attenuation of the energy due to the characteristics of the medium between source 10 and aperture A. $K_2$ also depends upon the attenuation of the energy due to the characteristics of the medium between apertures B and A. This attenuation, however, is negligible since the true path length between entrance pupils or virtual and projected apertures in space is the distance between exit pupils in image space rather than the object space distance. Dividing 1 by 2 gives:

$$\frac{P_1}{P_2} = \frac{K_1}{K_2} \cdot \frac{R_2^2}{R_1^2} \qquad (3)$$

Let $$\frac{K_1}{K_2} = K \qquad (4)$$

and $$\Delta R = R_2 - R_1$$
$$R_2 = R_1 + \Delta R \qquad (5)$$

Substituting (5) and (4) in (3) gives:

$$\frac{P_1}{P_2} = \frac{K(R_1 + \Delta R)^2}{R_1^2} \qquad (6)$$

Solving for $R_1$ gives:

$$R_1 = \frac{\Delta R}{\sqrt{\frac{P_1}{P_2 K}} - 1} \qquad (7)$$

From the above, it is seen if the energy passing through apertures B and A is known and if $\Delta R$ and K are known, the absolute range to the radiating source can be determined. Moreover, if the effects of atmospheric attenuation between apertures B and A are neglected and if the apertures are of the same size, $K_1 = K_2$ and $K = 1$. Equation 7 may then be written as follows:

$$R_1 = \frac{\Delta R}{\sqrt{\frac{P_1}{P_2}} - 1} \qquad (7a)$$

It will be shown below that in a number of embodiments of the ranging system of this invention, the air-path distance between apertures A and B is negligible and K can therefore readily be made substantially equal to 1.

FIGURE 2 illustrates one embodiment of a ranging system according to this invention. The energy from source 10 is focused or converged by an optical system 12 shown as a single lens. It is to be understood, of course, that the system may include reflectors or a plurality of lenses. It is also to be understood that in the case in which source 10 is a radiator of radio-frequency waves, optical system 12 becomes a radio-frequency energy focusing system such as a metallic lens antenna, a parabolic reflector, or the like. In the case in which the system 12 is a reflector rather than a lens, apertures A and B are positioned in front of rather than behind the system.

Optical system 12 has an infinite or principal focal point $F_\infty$ which we may define as the point at which radiation from an infinite source is focused. Aperture A is located in front of the principal focus and aperture B behind the principal focus. As will be explained in more detail below, apertures A and B are placed in their respective operating positions in succession.

It can be shown from the laws of optics that when aperture A is positioned in front of the principal focus, as shown, a virtual image of the aperture appears at 14 well beyond the principal focus. The closer aperture A is to the focus, the further the virtual image is spaced from the focus. Aperture B, which is located beyond the focus, appears as a real image 16 well in front of the focusing system. As in the case of aperture A and its virtual image, the closer aperture B is to the focus, the further is its real image in front of the optical system.

If one considers the system looking from source 10 toward the lens 12, aperture B, although located close to the focus, actually appears as if it is at the location of its real image 16. Thus, the amount of energy which passes through aperture B, when it is in its operative position, is exactly the same as if an aperture of increased size were located at position 16. The same concept holds for aperture A and its virtual image 14. The amount of energy which passes through aperture A is exactly the same as if aperture A were removed and a larger aperture (one the same size as the virtual image of aperture A) were located at 14. Thus, from a practical standpoint, positioning apertures A and B as shown in FIGURE 2 is exactly the same as if two larger apertures were positioned at 14 and 16, that is, spaced a distance $\Delta R$ from one another. However, since the actual distance between the apertures is negligible compared to the range of the radiating object, there is substantially no attenuation of energy between the two apertures due to the characteristics of the energy transmitting medium (due to dust or moisture in the air, for example).

Referring still to FIGURE 2, apertures A and B are smaller than the focused beam in which they are located and therefore receive only a portion of the beam. Positioned beyond aperture B is a detector 18 such as a lead sulphide cell (in the case in which source 10 is an infrared radiator). The detector is sufficiently large to receive all of the energy passed by aperture B when it is in its operative position and all of the energy passed by aperture A when the latter is in its operative position.

A practical system according to this invention is shown in FIGURE 3. The focusing system again is shown as a lens 12. Aperture A is in a semi-circular sheet of material 20, and aperture B is in a similarly shaped sheet of material 22 (see FIGURE 4). Both sheets are fixed to a common shaft 24 which is driven by a driving means schematically illustrated by block 26. Detector 18 alternatively receives radiation passed by apertures A and B. When aperture A is in its operative position, switch 27 connects the detector to amplifier and chopper circuit 30, and when aperture B is in its operative position, switch 27 connects the detector to amplifier and chopper circuit 28.

A second optical system 12a located adjacent the one just described receives energy proportional to the background surrounding the radiating object and adjacent the field of view of detector 18. It applies this energy to a detector 32 which in turn is connected to an amplifier and chopper 34.

Subtraction circuit 36 subtracts the output of stage 30 from that of stage 28, and subtraction circuit 38 subtracts the output of stage 34 from that of stage 30.

In operation, the drive means may include a motor and a gearing arrangement for intermittently rotating shaft 24 in such manner that aperture A is placed in the focused beam for a given interval of time, and then aperture B is placed in the focused beam for a given interval of time. The same shaft which drives shaft 24 is also connected to switch 27 for connecting stage 30 to the detector when aperture A is in its operative position and stage 28 to the detector when aperture B is in its operative position. The intermittent signals applied to stages 28 and 30 may be converted by the choppers in these stages to alternating current signals. These are proportional to the respective energies $P_1$ and $P_2$ sensed when apertures B and A are in their respective operating positions plus noise. The background noise is amplified by stage 34. Subtraction circuits 36 and 38 separate the noise signal from the energy signals and produce at leads 40 and 42 alternating current signals indicative of $\Delta P$ and $P_2$, respectively.

From the optics of the system, $\Delta R$, the distance between the space erected apertures corresponding to apertures B and A, is known. With this information and $P_1$ and $P_2$, the absolute range to the radiating object may be calculated using Equation 7a. However, in a fully automatic system voltages indicative of $\Delta P$ and $P_2$ are applied to a computer 44 which solves the equation and produces a direct reading of range on range meter 46. Scale factor $K_s$ may simply be an alternating voltage tapped off a potentiometer 48.

In the embodiment of FIGURE 3, two optical systems, two detectors and three amplifier channels are required. Due to the extremely low level of the signal detected, the embodiment of FIGURE 3 is fairly sensitive to changes in system parameters. Thus, if the tubes in stage 28 change their characteristic slightly due to aging or other causes, the amplifier output will change and there will be an error in the indication of range. The system of FIGURE 11 overcomes the above disadvantages. Only a single detector and single amplification channel are required. These are employed using time sharing techniques.

Figure 11:
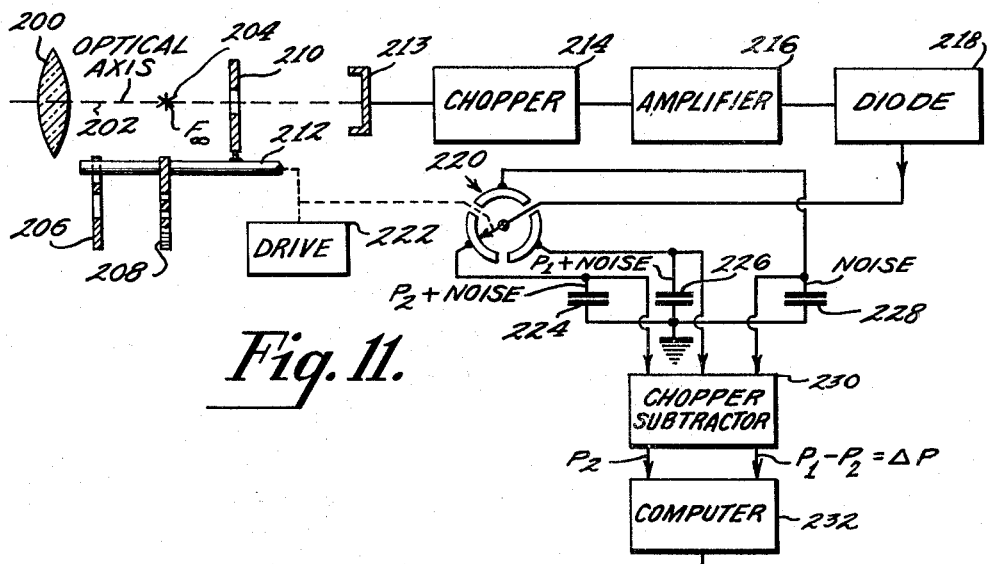
Figure 11A:
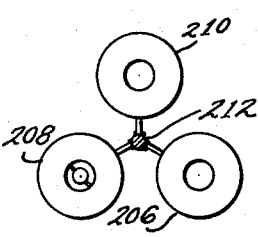
FIGURE 11a is a plan view of a shutter which may be used in the arrangement of FIGURE 11.

Referring to FIGURE 11, the optical system is shown as a single lens 200 having an optical axis 202. The principal focal point is shown at 204. The shutter arrangement consists of three members 206, 208 and 210 mounted on a single shaft 212. With an intermittent type of drive the three members may be as indicated in FIGURE 11a. The aperture of member 210, when in position, defines an entrance pupil which is real; the aperture in member 206, when in position, defines an entrance pupil which is virtual; and the aperture in member 208, when in position, is in the plane containing the infinite focal point $F_\infty$. Note in FIGURE 11a that the aperture in member 208 contains an opaque member at its center which prevents any energy from the radiating source from reaching the detector. (The source of interest is a point source.) However, energy radiated from the background does pass through the aperture.

Energy passing through the respective apertures, when they are in position, is detected by detector 213, passed to chopper 214 which converts the same to alternating current and then applied through amplifier 216 and diode 218 to switch 220. The switch is driven in synchronism with shaft 212 by the common drive means 222. The stators of the switch 220 are connected to three storage condensers 224, 226 and 228. Condenser 224 stores a charge proportional to $P_2$, the amount of energy passing through the real object space erected aperture; condenser 226 stores a charge proportional to the energy passing through the virtual space erected aperture (the aperture in member 206); and condenser 228 stores a charge proportional to the background noise.

Chopper-subtractor sttage 230 converts the energy stored by condensers 224, 226 and 228 to alternating currents and, in addition, subtracts the charge on condenser 228 from the one on condenser 224, and subtracts the charge on condenser 224 from the one on condenser 226. The resultant alternating current signals applied to computer 232 are proportional to $P_2$, the amount of energy radiated from the source which is sensed at the real space erected aperture (the aperture in member 210) and the difference in energies $\Delta P$ sensed at the two apertures (the ones in members 210 and 206). The computer solves the equation given in the foregoing discussion and produces on range meter 234 an indication of range of the radiating object.

Another type of optical configuration which may be used with this invention is illustrated in FIGURES 5 and 6. Collector 50 may, for example, be a mirror (in the case in which the energy detected is light or infrared waves). On the other hand, if the source is one of radio waves, the collector may be a parabolic metal reflector. Aperture A is located in front of the focal point of the collector, and aperture B beyond the focal point. In a practical system, in order to avoid the effects of shadows introduced by the detector, the collector may be tilted slightly so as to throw the reflected wave off axis, and the detector placed outside of the incident wave and in the path of the reflected wave. Also, two reflectors and detector-aperture systems may be used to prevent the shadow of one on the other. This is analogous to the arrangement of FIGURE 7). The dimensions may be as follows (see FIGURES 5 and 6):

$a = 0.050$ inch $b = 0.142$ inch $c = 2.78$ inches $d = 0.98$ inch

The reflector or reflectors used may have a 5.75 inch diameter, and the focal distance, that is, the distance between the focus and the reflector may be 48 inches.

FIGURE 6 shows the locations of the projected aperture of B and the virtual aperture of A. Note that since A is closer to the focus than B, its virtual image appears substantially further from the collector position than the projected image of B. The spacings $c$ and $d$ were chosen to make the projected images of the two apertures of the same size. The dimensions shown in FIGURE 6 are as follows:

$a' = 2.45$ inches $b' = 2.45$ inches $c' = 73$ feet $d' = 192$ feet $\Delta R = 265$ feet FIGURE 7 illustrates a type of system according to this invention in which two focusing systems 52 and 54 are employed. The focusing systems are side by side and each has its own detector 56 and 58, respectively. Detector 56 is located beyond the focus and appears as a real image at 60, whereas detector 58 is in front of the focus and appears as a virtual image at 62. An advantage of the arrangement of FIGURE 7 is that no means are required alternately to position apertures A and B in their operating locations since detectors 56 and 58 are continuously and simultaneously operative. A disadvantage of the arrangement of FIGURE 7, however, is that the two separate detectors must be perfectly balanced.

Referring for a moment to Equation 6 (when $K=1$)

$$\frac{P_1}{P_2} = \frac{(R_1 + \Delta R)^2}{R_1^2} \quad (6)$$

Let $$P_1 = P_2 + \Delta P \quad (8)$$

Substitute (8) in (6) and solve for $\Delta P/P_2$ $$\frac{P_2 + \Delta P}{P_2} = 1 + \frac{2\Delta R}{R_1} + \frac{\Delta R^2}{R_1^2}$$

$$1 + \frac{\Delta P}{P_2} = 1 + \frac{2\Delta R}{R_1} + \frac{\Delta R^2}{R_1^2}$$

$$\frac{\Delta P}{P_2} = \frac{2\Delta R R_1 + \Delta R^2}{R_1^2} \quad (9)$$

Invert (9)

$$\frac{P_2}{\Delta P} = \frac{R_1^2}{2\Delta R R_1 + \Delta R^2} \quad (10)$$

It can be shown from Equation 10 that when the range R being measured is at least five times as great as $\Delta R$ then $P_2/\Delta P$ is a straight line function of range, within about 1%. R can be shown to be equal to $$N[P_2/\Delta P] + N_1$$

when N and $N_1$ are constants. Under these conditions, the range of the radiating object may readily be determined with the system shown in FIGURE 8. Assume that a signal proportional to $P_1$+background noise is applied to terminal 60 and a signal proportional to $P_2$+background noise is applied to terminal 62. Assume also that a background noise signal is applied to terminal 64. The three signals just mentioned are detected and amplified in stages 66, 68 and 70, respectively. Subtraction circuit 72 subtracts $P_2$+noise from $P_1$+noise to obtain $\Delta P$. Subtraction circuit 74 subtracts noise from $P_2$+ noise to obtain signal $P_2$. Signals $\Delta P$ and $P_2$ are amplified in stages 76 and 78 and fed to a computer 80. The computer divides $\Delta P$ by $P_2$, multiplies the product by N, a constant proportional to $\Delta R$ and then adds $N_1$, another constant. The computer applies its output to an ammeter or a voltmeter 82 which is directly calibrated in range.

FIGURE 9 shows a system which is perhaps more basic optically than the systems shown in FIGURES 2 and 7. The optics of this system could be represented by the bottom half of FIGURE 7 if aperture A were the removable aperture and detector 58 were large enough and positioned so as to collect the full beam. A similar basic system could be built around the top half of FIGURE 7 with aperture B, the removable aperture (in this case with its image projected forward of the collector) and with detector 56 large enough to encompass the full beam.

Either of the two systems might be described generally as follows: Absolute range is computable from two measurements; (a) the total amount of radiation collected onto a detector from a target and (b) the amount of radiation impinging on the detector when an aperture is positioned fully within the uniform beam between the collector and the detector. The word "uniform" is used here to eliminate positions at or very close to the focus where a non-uniformity of beam cross section is introduced by virtue of the circle-of-confusion of the collector.

In the specific embodiment shown in FIGURE 9 the detector 84 is located at the principal focus of the focusing system 86. It therefore receives all of the energy passed by the system and thus acts like an aperture located at the lens position and of the same size as the lens. Member 88 formed with an aperture A therein is driven by drive means 89 in such manner as to periodically appear between the focus and the lens. Thus, the virtual image of aperture A appears at 90 substantially beyond the infinite focus. The spacing between the lens and the virtual image is $\Delta R$.

With the system of FIGURE 9, or the analogous one described in connection with the top half of FIGURE 7, if the projected aperture A' is the same size as the collector, range information is available from a target only if it is exactly on the optic axis or off the optic axis by no more than the radius of the collector. In practice, this creates difficulties both because of the extreme difficulty of pointing so precisely at a small target and because any target larger than the collector could not give proper range information. This disadvantage may be overcome by making the removable aperture small enough to be completely encompassed by the converging beam, even when light from a source slightly off axis is collected. (This is the arrangement illustrated in FIGURE 9.) However, in this case, the image of the aperture is smaller in size than the lens. The radiation data received when the aperture is in position therefore must be normalized, that is, the outputs of the detector must be divided by the respective fixed collector areas. When the aperture is in position, the output must be divided by the area of the aperture image and when the aperture is not in position, the output must be divided by the lens area. In this way the amount of radiation received per unit area is obtained and this enables one to determine the range to the radiating source.

Figure 10:
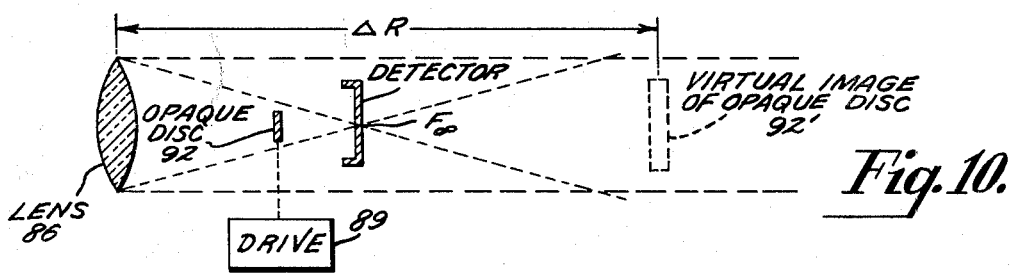

In the system of FIGURE 10, the aperture A is replaced by an opaque disc 92. This disc appears as a virtual opaque image at 92'. The detector is positioned at the principal focal point $F_\infty$. As in the embodiment of FIGURE 9, $\Delta R$ is the spacing between the lens 86 and the virtual image of the opaque disc 92'. In operation, the energy sensed per unit area when the opaque disc is removed is equal to $P_1$ and when the opaque disc is in position is equal to $P_1 - P_2 = \Delta P$.

The opaque disc 92 may be driven in at least two different ways. In one, the disc is merely rotated about its diameter. Thus, in one disc position energy passing through lens 86 sees only the narrow edge of the disc, and in the other position this energy sees the disc broadside. Preferably, the drive is intermittent so as to permit discrete energy sensing intervals for the broadside and on-edge positions of the disc. The other type of drive system is analogous to the one shown in FIGURE 9. In this type of drive system the disc is positioned offset from a rotatable shaft so that the disc may be alternately moved to the position shown in FIGURE 10 and then to a position outside of the focused beam.

In the various embodiments of the invention described herein it has been assumed that the range $\Delta R$ is maintained constant during system operation. It is to be understood that in certain applications this need not be the case. In these applications it may be desirable to change the accuracy limits during different modes of operation. For example, in collision warning systems, when the source whose distance is being sensed is beyond a certain range, a relatively low order of accuracy is all that is required, however, at short ranges a relatively high degree of accuracy is required. It will be remembered that the ratio $R/\Delta R$ should be greater than 5 for accuracy of 1%. Accordingly, in a two-scale system, $\Delta R$ may be decreased when the source of interest is within a given short range. This may be done relatively simply by changing the distance positions of the image space apertures, thus changing the range scale.

What is claimed is:

A system for determining the range of an object radiating energy, said system comprising an optical system having a prinicpal focus, means providing an aperture between said optical system and said principal focus which is imaged to provide an entrance pupil on the side of said principal focus away from said optical system, said range determining system also having means providing as an image a second entrance pupil on the same side of said principal focus as said optical system, the distance between said two entrance pupils being $\Delta R$, means for obtaining a measurement proportional to the energy $P_1$ passing through said second entrance pupil, and means for obtaining a measurement proportional to the energy $P_2$ effectively passing through said first mentioned entrance pupil whereby the ratio $P_1/P_2$ may be determined, and whereby said range may be determined from the relation $$R = \frac{\Delta R}{\left(\sqrt{\frac{P_1}{P_2}}\right)K - 1}$$

where R is the distance to the radiating object, and where K is a constant.

References Cited in the file of this patent

UNITED STATES PATENTS

| | | |
|---|---|---|
| 2,206,036 | Herson | July 2, 1940 |
| 2,237,193 | Mobsby | Apr. 1, 1941 |
| 2,254,548 | Ruhle | Sept. 2, 1941 |
| 2,444,235 | Walker | June 29, 1948 |
| 2,524,807 | Kallmann | Oct. 10, 1950 |